United States Patent [19]
Wahl

[11] Patent Number: 5,602,845
[45] Date of Patent: Feb. 11, 1997

[54] METHOD OF GENERATING A RANDOM ELEMENT AS WELL AS A METHOD FOR TRAFFIC MIXING, RANDOM ELEMENT GENERATOR AND SYSTEM COMPONENT THEREWITH

[75] Inventor: Stefan Wahl, Schwieberdingen, Germany

[73] Assignee: Alcatel N.V., Rijswijk, Netherlands

[21] Appl. No.: 560,026

[22] Filed: Nov. 17, 1995

[30] Foreign Application Priority Data

Nov. 30, 1994 [DE] Germany .......................... 44 42 532.5

[51] Int. Cl.$^6$ .................................................. H04L 12/56
[52] U.S. Cl. ............................................. 370/395; 364/717
[58] Field of Search ........................... 370/60, 60.1, 94.1, 370/94.2, 94.3, 107, 119, 95.1, 85.2; 364/717, 717.5

[56] References Cited

U.S. PATENT DOCUMENTS

| | | | |
|---|---|---|---|
| 4,761,778 | 8/1988 | Hui | 370/60 |
| 4,891,805 | 1/1990 | Fallin | 370/95.1 |
| 5,130,975 | 7/1992 | Akata | 370/60 |
| 5,499,238 | 3/1996 | Shon | 370/60.1 |

FOREIGN PATENT DOCUMENTS

| | | |
|---|---|---|
| 0609570 | 8/1994 | European Pat. Off. . |
| 4010305 | 10/1991 | Germany . |

OTHER PUBLICATIONS

"Alcatel ATM Switch Fabric and its Properties", D. Boettle et al, *Electrical Communication*, vol. 64, No. 2/3, 1990, pp. 156–165.
"A Methodology for Buffer Design in ATM Switches", F. Bernabei et al, *CNR Serminar: Broadband Communication Networks and Services* Rome Oct. 30–31, 1990, vol. 2, No. 4, Jul.–Aug. 1991, pp. 367–379.
"Congestion Control Strategies in ATM Networks", L. Fratta et al, *CNR Seminar: Broadband Communication Networks and Services*, Rome Oct. 30–31, 1991, vol. 3, No. 2, Mar.–Apr. 1992, pp. 183–193.
"Performance Study of an ATM Self–Routing Multistage Switch with Bursty Traffic: Simulation and Analytic Approximation", Y. Xiong et al, *IEEE ICC '93*, Geneva, May 1993, vol. 4, No. 4, Jul.–Aug. 1993, pp. 443–453.

*Primary Examiner*—Hassan Kizou
*Attorney, Agent, or Firm*—Ware, Fressola, Van Der Sluys & Adolphson

[57] ABSTRACT

For traffic mixing, an implementation involves generating a random element in a device that detects nondeterministic events already occurring in operation of the device and mapping them to the random element by means of an assignment rule. The traffic mixing in an ATM switching element (SE) is achieved by cyclically writing data packets into a buffer (MEM) and cyclically reading data packets out of a buffer (MEM). The write cycle in this case is clocked by the arrival of a data packet, that is, by a nondeterministic event. The read cycle is clocked by a stable clock signal.

10 Claims, 2 Drawing Sheets

METHOD OF GENERATING A RANDOM ELEMENT AS WELL AS A METHOD FOR TRAFFIC MIXING, RANDOM ELEMENT GENERATOR AND SYSTEM COMPONENT THEREWITH

TECHNICAL FIELD

The invention pertains to generating a random element, to a method for traffic mixing, to a random element generator, and to a system component for a telecommunications system.

BACKGROUND OF THE INVENTION

One large area of application for random element generators is in traffic mixers. They are needed therein in order to mix the traffic at random and thus to achieve a good statistical traffic mixing.

The invention proceeds from traffic mixers of this kind and for example, from the random element generator used in them.

One traffic mixer of this type is described in European Patent Application, Publication No. 0 609 570 A1, corresponding to copending U.S. patent application Ser. No. 08/178,095 filed Jan. 6, 1994. This device scrambles the sequence of the time slots of a synchronous data stream that is arriving in an ATM switching network (ATM=Asynchronous Transfer Mode). To do this, it writes the data packets contained in the time slots cyclically into a buffer and then reads them from the buffer according to randomly generated permutations. The permutations in this case are created by a pseudo-random generator that is formed by a feedback shift register.

DISCLOSURE OF INVENTION

Use of a feedback shift register as pseudo-random generator requires an additional expense for components to create the shift register.

The invention is based on the problem of providing a random element at little expense.

According to a first aspect of the present invention, a random control signal is generated in a device by detecting nondeterministic events occurring during operation of the device and mapping the detected events to the random control signal by means of an assignment rule. The device may, for example, execute functions for an ATM communications network. In that case, the nondeterministic events that are detected may be defined by the arrival of data packets. Or, in general, the nondeterministic events that are detected may be defined by the contents of data packets or by the occupancy levels of internal memories.

In accordance with a second aspect of the present invention, traffic is mixed in a switching network for data packets by detecting nondeterministic events occurring during operation of the switching network, and randomly scrambling data packets in a scrambling process controlled by means of the detected events. In the case of an ATM switching network, for the scrambling process, the data packets may be cyclically written into and read from a buffer, with the data packets being erased during readout from the buffer, and the write-in and readout being controlled by the events and deterministically, respectively. The arrival of data packets may be detected as events and the write cycle clocked by the detected events, whereas the read cycle may be clocked by a stable clock signal.

According to a third aspect of the present invention, a random element generator for a device is for detecting nondeterministic events occurring during the operation of the device and is for providing a random control signal from the detecting of the events by means of an assignment rule.

In accord with a fourth aspect of the present invention, a system component for a telecommunications system has a random element generator that includes means for detecting nondeterministic events occurring during operation of the component for providing a random control signal from the detecting of the events by means of an assignment rule.

The basic idea of the invention is that nondeterministic events already occurring in operation of a device, are detected and a random element is generated from them by means of a mapping rule. In this case, a separate random generator is not used for the generation of a random element, but rather an already existing, statistical process is used.

In this case any chance effect on a process is viewed as a random element. For example, random numbers or a signal with random chronological spacing between signal pulses are random elements.

The advantage of the invention is that the component expense for the implementation is reduced. An additional advantage is that the time for provision of a random element is reduced by the invention.

The use of this basic idea here is an advantage for traffic mixing, since particularly high speed requirements exist there and thus easy to create hardware implementations are required.

An implementation of the invention that scrambles the sequence of data packets for traffic mixing by writing to and reading from a buffer has the additional advantage that a very good traffic mixing is assured thereby, which otherwise is achieved only by means of complicated permutation.

These and other objects, features and advantages of the present invention will become more apparent in light of the detailed description of a best mode embodiment thereof, as illustrated in the accompanying drawing.

BEST MODE FOR CARRYING OUT THE INVENTION

In the first embodiment, the implementation of the invented method for traffic mixing in a switching element according to the invention is described, which is part of a switching network according to the invention and is equipped with a random element generator according to the invention. In this case, the implementation of the invented method for generation of a random element is also described.

Figure 1:
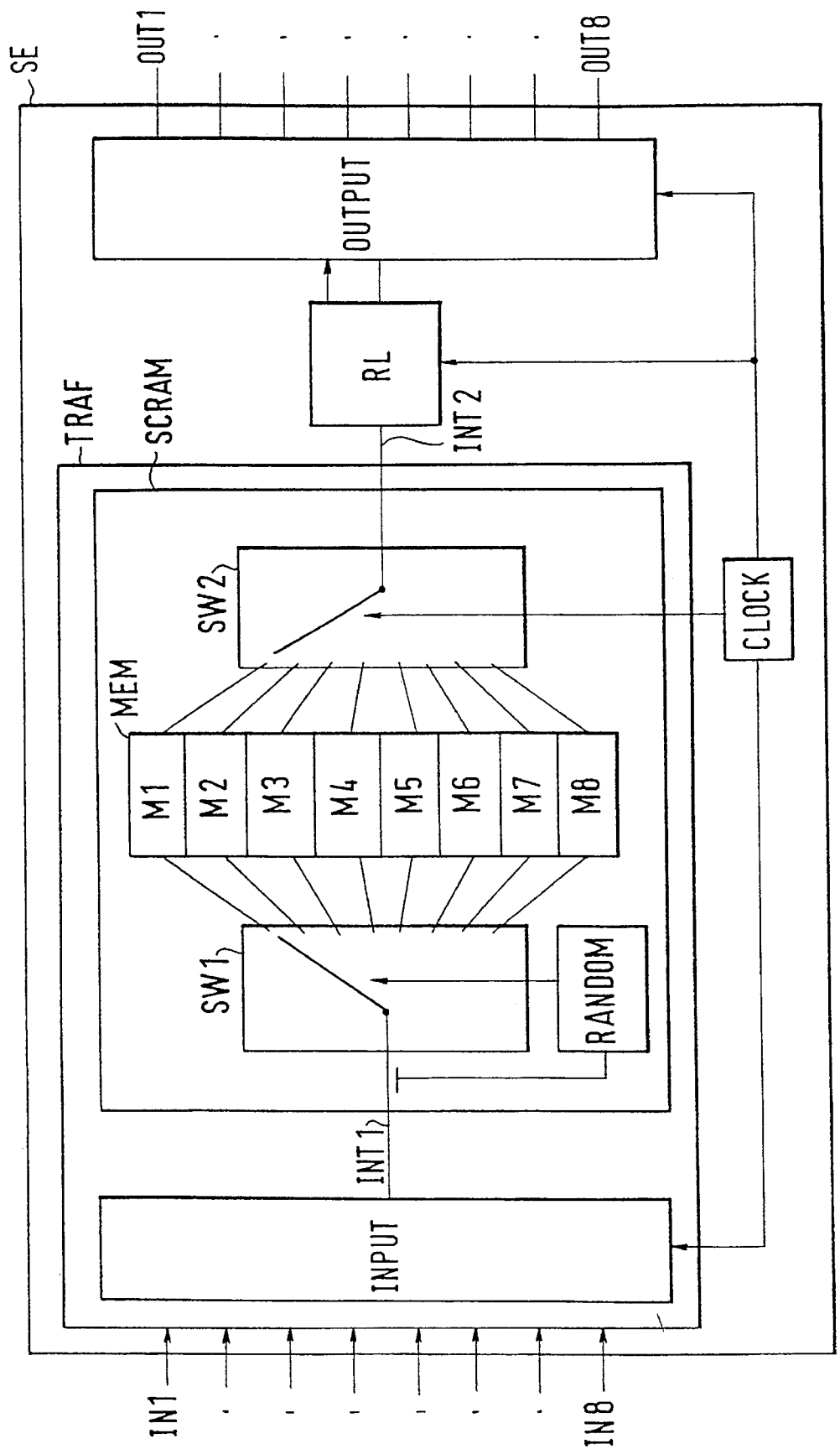
FIG. 1 shows a block diagram of a switching element according to the invention.

FIG. 1 shows a switching element SE with eight input lines IN1–IN8 and eight output lines OUT1–OUT8.

The switching element SE is a part of a switching network that is used for processing ATM data packets.

The processing of ATM data packets by the switching element SE is selected here only as an example, since a number of nondeterministic events result from the random arrival spacing between two ATM data packets and traffic mixing is an important factor in an ATM switching network. The same advantages would result if data packets of differing length were processed with the switching element SE. The switching element could also operate in a synchronous or partially synchronous environment, in which it receives synchronous data streams via the input lines IN1 to IN8, for example.

In addition to the switching element SE, the switching network also contains a number of additional switching elements. The switching elements of the switching network are arranged in a multistep switching network arrangement, with one of the switching network stages operating as a distributor stage. The switching elements of this distributor stage are designed like the switching element SE.

The structure of a switching network of this kind can be found in the article "Alcatel ATM Switch Fabric and Its Properties" *Electrical Communication,* Vol 64, No. 2/3, 1990 by D. Böttle and M. A. Henrion.

It is also possible for only a single, or all switching elements of a switching network to be configured like the switching element SE.

ATM data packets arrive at the switching element SE via the input lines IN1 to IN8. The ATM data packets all have the same length and arrive at the switching element SE with random arrival spacing. Based on destination information provided as a notation in the header of each arriving ATM data packet, the switching element SE directs these ATM data packets to one of the output lines OUT1 to OUT8 of the switching element SE and then transmits them via these outputs.

The switching element SE features a traffic mixer TRAF, a route search device RL, an output device OUTPUT and a clock generator CLOCK.

The traffic mixer TRAF receives data packets via the input lines IN1 to IN8 and transmits data packets via a line INT2 to the route search device RL. The output device OUTPUT receives data packets and route search data from the route search device RL and transmits data packets via the output line OUT1 to OUT8. The clock generator CLOCK sends clock signals to the traffic mixer TRAF, the route search device RL and the output device OUTPUT.

The clock generator CLOCK provides clock signals for the traffic mixer TRAF, the route search device RL and the output device OUTPUT. The clock rate of these clock signals in this case corresponds to eight times the clock rate of that clock rate that is defined by the minimal arrival spacing of two sequential ATM data packets on one of the input lines IN1 to IN8. The clock rate is thus determined by the length of an ATM data packet and by the bit rate on the connecting routes between the switching elements. The clock signals are generated in the clock generator CLOCK, for example, by means of an oscillation circuit with a piezoelectric crystal.

It is also possible for the clock signals to be generated by a clock generator that is located outside of the switching element SE. It is also possible for the traffic mixer TRAF, the route search device RL or the output device OUTPUT to be equipped with a separate clock generator.

The traffic mixer TRAF mixes the traffic streams arriving along the input lines IN1 to IN8 at random and concentrates them on the line INT2, which thus has eight times the data rate of the input lines IN1 to IN8. Thus the traffic mixer TRAF makes it impossible to determine on line INT2 the origin of an ATM data packet on input lines IN1 to IN8. The output lines OUT1 to OUT8 and the input lines IN1 to IN8 are thus no longer linked at specified time intervals.

The route search device RL analyzes the route search data in the route address field of each ATM data packet. Depending on these route search data and the route search method implemented in the route search device RL, it then assigns one of the output lines OUT1 to OUT8 to the ATM data packet. Subsequently, it directs the ATM data packet and the associated route data, indicating which output line is used to send the ATM data packet, to the output device OUTPUT.

It is also possible that for an entire group of output lines, not a single output line, to be specified by the route search device RL as a group of output lines along which the ATM data packet is to be sent.

The output device OUTPUT sends ATM data packets received from the route search device RL to the output lines of output lines OUT1 to OUT8 specified by the associated route data. The data rate on the output lines OUT1 to OUT8 corresponds in this case to the data rate on the input lines IN1 to IN8 and is thus eight times less than the data rate at which the ATM data packets are arriving from the route search device RL. The output device OUTPUT thus has available a corresponding buffer to be used to bring about the adaptation of the differing data rates.

The ATM data packets arriving at the same time along the input lines IN1 to IN8 are concentrated in the traffic mixer TRAF in random sequence on the line INT2. Next, in the route search device RL, for each ATM data packet, those output lines OUT1 to OUT8 are determined via which packets are to be transmitted, and packets are then sent out in the output device OUTPUT on this output line.

The traffic mixer TRAF features an input device INPUT and a scrambler SCRAM. The input device INPUT receives ATM data packets via the input lines IN1 to IN8 and sends ATM data packets along a line INT1 to the scrambler SCRAM, which sends ATM data packets along the line INT2 to the route search device RL.

The input device INPUT multiplexes the ATM data packets from the input lines IN1 to IN8 on the line INT1. The data rate on the line INT1 is thus eight times greater than that on the input lines IN1 to IN8. The input device INPUT senses the input lines IN1 to IN8 cyclically and directs any possibly present data packet along the line INT1. The clock signal from the clock generator CLOCK determines the switch to the next input line.

The scrambler SCRAM scrambles the series of data packets arriving along the line INT1. Thus it seems on line INT2 as if the input lines IN1 to IN8 have already been selected by the input device INPUT in a random sequence for the multiplexing device.

The scrambler SCRAM features two switching devices SW1 and SW2, one memory device MEM with eight memory locations M1 to M8 and a random element generator RANDOM.

The switching device SW1 receives ATM data packets via the line INT1 and exchanges data with the memory locations M1 to M8 of the memory device MEM. The switching device SW2 exchanges data with the memory locations M1 to M8 of the memory device MEM and sends ATM data packets along the line INT2. The random element generator RANDOM picks or detects data from the line INT1 and sends control data shown in the form of a random control signal to the switching device SW1. The switching device SW2 receives clock signals from the clock generator CLOCK.

The switching device SW1 writes the ATM data packets received along the line INT1 into one of the memory locations M1 to M8. The memory location among the memory locations M1 to M8 into which an ATM data packet has been written is determined by the switching device SW1 as follows:

The switching device SW1 determines the next, sequential memory location from the memory locations M1 to M8 for a current memory location according to a specified, deterministic write cycle. The change to the next, sequential memory location is triggered by the random control signal from the random element generator RANDOM. If a change of this type to the next, sequential memory location has occurred, then the switching device SW1 reads data from this memory location and based on this data, it checks whether this memory location is occupied by an ATM data packet. If this is correct, then the switching device SW1 changes to the particular, next, sequential memory location according to the read cycle, until a free memory location is found. Next, the ATM data packet is written into this memory location.

It is also possible to provide an additional list with a notation about whether one of the memory locations M1 to M8 is occupied or not. By means of this list it would then be checked whether a memory location is or is not occupied by an ATM data packet.

The random generator RANDOM picks or detects data from the line INT1 and from this, creates a random element and provides control data, or the control signal that causes a random change to the next, sequential memory location in the switching device SW1.

The random element generator can thus detect the arrival of an ATM data packet. Since the arrival interval between two sequential ATM data packets on one of the input lines IN1 to IN8 is random, the arrival interval between two sequential ATM data packets on the line INT1 is also random. Thus the arrival of an ATM data packet detected by the random element generator RANDOM is likewise a random event that corresponds to a particular random distribution. This random event is now mapped by the random element generator RANDOM by means of a specified assignment rule to the random control data or signal, which then causes the change to the next memory location in the switching device SW1.

In the simplest case this mapping rule reflects in the fact that for each arrival of this event, a change to the next memory location is effected. However, it is also possible to use more complex assignment rules. For example, it is possible to trigger two or more changes, in sequence, upon arrival of the random event. It is also possible to vary the number of sequential changes cyclically upon arrival of each event. For example, one, three, two, one, . . . changes upon arrival of the random event.

It is also possible for one or several bits in the data field of an arriving ATM data packet to be detected by the random element generator, with the arrival of a particular binary digit combination being evaluated as a random event. An assignment rule in this case could comprise, for example, reading a particular number of ATM data packets into memory locations in sequence, upon arrival of certain random events. In this case an additional memory location for ATM data packets would be required in the switching device SW1.

An additional possibility for detecting nondeterministic events with the random element generator RANDOM is, for example, to detect data about the fill level of the internal memory of the switching element SE, for example, from receiving or sending buffers in the input and output devices of the switching element SE. In this case it is advantageous that random events are triggered by smaller fluctuations in fill level.

It is also possible to detect several different types of events in parallel.

The memory device MEM may be formed by a write-read memory with eight memory locations, in which the data quantity of an ATM data packet can be saved. The memory device MEM in this case can be formed either by a single memory chip or it can be part of a larger memory device with dynamic allocation of memory locations.

The switching device SW2 reads an ATM data packet from one memory location which represents the current memory location among the memory locations M1 to M8, and then deletes the ATM data packet from this memory location. Based on the clock signal from the clock generator CLOCK, the switching device SW2 carries out a change from a current memory location to the next, sequential current memory location. If no ATM data packet is saved in a memory location, then no such packet will be sent along the line INT2. Selection of the next, sequential memory location is determined by a specified read cycle. It is an advantage in this case for the read cycle to differ from the write cycle. If the write cycle and read cycle are the same, then the scrambler will no longer scramble the sequence of the ATM data packets, but rather their chronological spacing will be randomly changed. However, an identification of ATM data packets on the line INT2 with the input lines IN1 to IN8 is no longer possible either.

It is also possible that instead of ATM data packets, ATM data cells, and instead of no signal on the line, ATM void cells appear on the input lines IN1 to IN8, the output lines OUT1 to OUT8 and the lines INT1 and INT2. In this case, analogous to the foregoing, ATM data cells would be read into the buffer MEM, but upon read out a void-cell generator would be available that inserts a void cell on the line INT2 when no ATM data cell is read.

Furthermore, it is possible not to store the ATM data packets in the memory locations M1 to M8, but rather pointers that refer to such ATM data packets or that refer only to the header of these ATM data packets.

The flow of traffic through the switching element SE will be explained below using the example of FIG. 2.

Figure 2:
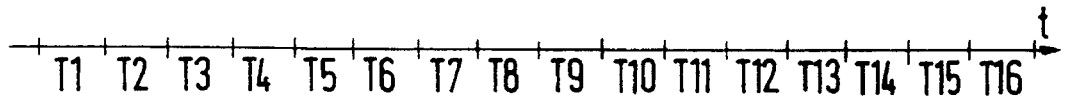
FIG. 2 shows a timing diagram of internal states of a switching element according to FIG. 1.

FIG. 2 shows the temporal position of nine ATM data packets P1 to P9 over a time period of 16 time units T1 to T16. In particular, FIG. 2 shows the temporal position of the ATM data packets P1 to P9 upon their arrival at the switching element SE via one of the input lines IN1 to IN8 and also their temporal position on the line INT1 and INT2. Furthermore, FIG. 2 shows at what time and in which of the memory locations M1 to M8 the ATM data packets P1 to P9 are saved.

The time units T1 to T16 are of equal duration. In this case their duration corresponds to the time duration that is needed for transmitting an ATM data packet on one of the internal lines INT1 or INT2, or corresponds to one-eighth of the time duration that is needed for transmitting an ATM data packet on the input lines IN1 to IN8 or the output lines OUT1 to OUT8.

During the time units T1 to T8 the ATM data packets P2, P3, P5, P6 and P8, respectively, arrive via the input lines IN2, IN4, IN5, IN6 and IN8. During the time units T9 to T16 the ATM data packets P1, P4, P7 and P9, respectively, arrive via the input lines IN1, IN4, IN7 and IN8. The input device INPUT directs these ATM data packets cyclically along the line INT1, with the sequence in which the input lines IN1 to IN8 are processed corresponding to their numbering. For example, the ATM data packets P2, P3, P5, P6, P8, P1, P4, P7 or P9, respectively, are transmitted on the line INT1 from the input device INPUT at the time units T2, T4, T5, T6, T8, T9, T12, T15 and T16.

The ATM data packets arriving via the line INT1 at the switching device SW1 are written by it into the memory locations M1 to M8 of the memory device MEM according to the algorithm described above. Thus in memory location M1 during time units T2 to T8, the ATM data packet P2 is stored, and during the time unit T16 the ATM data packet P9; in the memory location M2 during the time units T4 to T7 the ATM data packet P3, and in memory location M3 during the time units T5 and T6, the ATM data packet P5 is stored. During the time units T6 to T13, the ATM data packet P6 is stored in memory location M4; in memory location M5 during the time units T8 to T12, the ATM data packet P8 is stored, and in memory location M6 during the time units T9 to T11, the ATM data packet P1 is stored. Starting at time unit T12, the ATM data packet P4 is stored in memory location M7 and in memory location M8, starting at time unit T15, the ATM data packet P7 is stored.

The switching device SW2 reads ATM data packets cyclically from the memory device MEM, whereby the memory locations M1 to M8 are processed in the reverse order of their numbering, which is shown in FIG. 2 by two dashed lines. The read cycle here is very simply chosen, but could also be more complicated. Thus the switching device SW2 sends the ATM data packets P5, P3, P2, P1, P8, P6 and P9, respectively, along the line INT2 during the time units T6, T7, T8, T11, T12, T13 and T16. The traffic flows from the input lines IN1 to IN8 are thus randomly mixed. For example, in this case it appears as if the ATM data packets P5, P3, P2, P1, P8, P6 and P9 are arriving on the input lines IN6, IN7, IN8, IN3, IN4, IN5 and IN8, respectively.

It is also possible to carry out the traffic mixing in the output of the switching element and not on the input side as in FIG. 1. To do this, the scrambler SCRAM would have to be connected between the route search device RL and the output device OUTPUT.

Furthermore, it is possible to drive the switching element as a pure traffic mixer by omitting the route search device RL. In addition, the use of the traffic mixer TRAF at any other particular location of the switching network is possible.

In a second embodiment, the implementation of the method according to this invention to produce a random element in a switching network is explained; this switching network is equipped with a random element generator according to this invention.

The switching network is equipped with a device to generate a random number and contains a random element generator.

The random element generator is equipped like the random element generator according to FIG. 1. It detects a nondeterministic event that would occur in any case, for example, the arrival of an ATM data packet, and maps it to the random number by means of a mapping rule.

To do this, it counts the number of events that it detects within a clock period and passes this number as a random number.

It is also possible that to modify this number further by an algorithm, for example, by cropping of leading digits. It is also possible for these events to act as a stop signal for a counter whose count value is used as random number.

Additional possibilities would arise if the detected events were to be heterogeneous events. Such heterogeneous events would be determined for example by differing bit combinations in the data field of an arriving data packet. In this case it is possible for each of the heterogeneous events to be mapped to a particular numeric value, which is then passed as random number. Here, too, it is possible by more complex mapping rules, to obtain random numbers in a randomly selectable number range.

It is possible to equip any other system component of a telecommunications system with this type of random element generator.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method of generating a random control signal in a device (SE), comprising the steps of:
   detecting nondeterministic events occurring during operation of the device, and
   mapping detected occurrences of the nondeterministic events to the random control signal by means of an assignment rule.

2. A method as claimed in claim 1, wherein the device (SE) executes functions for an ATM communications network.

3. A method as claimed in claim 2, wherein events defined by the arrival of data packets (P1 to P9) are the nondeterministic events that are detected.

4. A method as claimed in claim 1, wherein events defined by the contents of data packets (P1 to P9) are the nondeterministic events that are detected.

5. A method as claimed in claim 1, wherein events defined by the occupancy levels of internal memories are the nondeterministic events that are detected.

6. A method of mixing traffic in a switching network for data packets, comprising the steps of:
   detecting nondeterministic events occurring during operation of the switching network, and
   in response to the detected events, randomly scrambling data packets (P1 to P9) in a scrambling process.

7. A method as claimed in claim 6, wherein the switching network is an ATM switching network, and wherein for the scrambling process, data packets (P1 to P9) are cyclically written into and read from a buffer (MEM), with the data packets (P1 to P9) being erased during readout from the buffer, and the write-in and readout being controlled by the events and deterministically, respectively.

8. A method as claimed in claim 7, wherein as events, the arrival of data packets (P1 to P9) is detected, and wherein the write cycle is clocked by the detected events, and the read cycle by a stable clock signal (CLOCK).

9. A random element generator (RANDOM) for a device (SE), the random element generator (RANDOM) comprising means for detecting nondeterministic events occurring during operation of the device (SE), and means, responsive to the detecting nondeterministic events, for providing a random control signal according to an assignment rule for mapping detected occurrences of the nondeterministic events to the random control signal.

10. A system component (SE) for a telecommunications system comprising:
    means for detecting nondeterministic events occurring during operation of the component (SE) for providing a detected data signal; and
    a random element generator (RANDOM), responsive to the detected data signal, for providing a random control signal according to an assignment rule for mapping detected occurrences of the nondeterministic events to the random control signal.

* * * * *

UNITED STATES PATENT AND TRADEMARK OFFICE
CERTIFICATE OF CORRECTION

PATENT NO. : 5,602,845
DATED : February 11, 1997
INVENTOR(S) : S. Wahl

It is certified that error appears in the above-indentified patent and that said Letters Patent is hereby corrected as shown below:

At column 4, line 67, please cancel "MS" and substitute --M8-- therefor.

At column 8, lines 49-50, please insert a colon after "comprising".

Signed and Sealed this

Twentieth Day of May, 1997

Attest:

Attesting Officer

BRUCE LEHMAN

Commissioner of Patents and Trademarks